United States Patent
Parekh et al.

(10) Patent No.: US 10,652,212 B2
(45) Date of Patent: *May 12, 2020

(54) SYSTEM AND METHOD FOR MANAGING THE DATA PACKETS EXCHANGED ACROSS A COMPUTER NETWORK

(71) Applicant: COLORTOKENS, INC., Santa Clara, CA (US)

(72) Inventors: Pankaj Parekh, Fremont, CA (US); Ashish Trivedi, Fremont, CA (US); Deepak Mohanty, Fremont, CA (US)

(73) Assignee: COLORTOKENS, INC. CA (US)

( * ) Notice: Subject to any disclaimer, the term of this patent is extended or adjusted under 35 U.S.C. 154(b) by 249 days.

This patent is subject to a terminal disclaimer.

(21) Appl. No.: 15/910,847

(22) Filed: Mar. 2, 2018

(65) Prior Publication Data

US 2019/0273719 A1 Sep. 5, 2019

Related U.S. Application Data

(60) Provisional application No. 62/466,046, filed on Mar. 2, 2017.

(51) Int. Cl.
*H04L 29/06* (2006.01)
*H04L 29/12* (2006.01)
(Continued)

(52) U.S. Cl.
CPC .......... *H04L 63/0236* (2013.01); *H04L 45/72* (2013.01); *H04L 45/745* (2013.01);
(Continued)

(58) Field of Classification Search
CPC ... H04L 63/0236; H04L 45/72; H04L 45/745; H04L 61/2564; H04L 67/14; H04L 9/321;
(Continued)

(56) References Cited

U.S. PATENT DOCUMENTS

8,874,785 B2 * 10/2014 Chaturvedi ....... H04L 29/12528 709/238
9,954,873 B2 * 4/2018 Mitchell ............. H04L 63/1416
(Continued)

*Primary Examiner* — Kambiz Zand
*Assistant Examiner* — Shu Chun Gao
(74) *Attorney, Agent, or Firm* — Barry Choobin; Patent 360 LLC (57) ABSTRACT

To obviate the possibility of a data packet requesting for a communication between a source computer and a destination computer being blocked either by a source firewall or a destination firewall or both, the source computer is configured to transmit the data packet to an intermediary sever, bypassing the source firewall and the destination firewall. The intermediary server is configured to analyze the data packet transmitted from the source computer and is further configured to acknowledge the need to establish a communication between the source computer and the destination computer. The intermediary server subsequently generates a notification notifying the destination computer to establish a communication with the source computer. The intermediary server transmits a notification to the destination computer and triggers the destination computer to respond to the notification and establish a communication session with the source computer.

12 Claims, 3 Drawing Sheets

(51) Int. Cl.
*H04L 12/741* (2013.01)
*H04L 12/721* (2013.01)
*H04L 29/08* (2006.01)

(52) U.S. Cl.
CPC .......... *H04L 61/2564* (2013.01); *H04L 67/14* (2013.01); *H04L 61/6013* (2013.01)

(58) Field of Classification Search
CPC . H04L 9/3263; H04L 9/3271; H04L 63/0464; H04L 63/166; H04L 2209/56; H04L 2209/80; H04L 45/22; H04L 41/50; H04L 47/193; H04L 47/22; H04L 47/27; H04L 47/38; H04L 47/2441; H04L 29/06; H04L 63/0227; H04L 63/0263; H04L 63/0272; H04L 67/125; H04L 63/105; H04L 63/0823; H04L 67/34; H04L 67/38; H04L 41/0803; H04L 41/28; H04L 61/2514; H04L 67/02; H04L 67/141; H04L 61/2575; H04L 61/305; H04L 67/025; H04L 63/168; H04L 29/12; H04L 61/2589; H04L 61/301; H04L 61/6063; H04L 67/26; H04L 63/0861; H04L 47/2475; H04L 41/5019; H04L 41/5051; H04L 41/0893; G06F 9/4413; G06F 9/4411; G06F 16/95; H04W 12/06; H04W 4/70; H04W 28/0215; H04W 76/022; H04W 28/24; H04W 76/12; H04W 28/0226; H04W 28/0268; H04W 8/18; H04W 4/50; G06Q 10/103; H04M 15/66

See application file for complete search history.

(56) References Cited

U.S. PATENT DOCUMENTS

| | | | |
|---|---|---|---|
| 10,348,767 B1* | 7/2019 | Lee | H04L 63/029 |
| 10,440,049 B2* | 10/2019 | Boutnaru | H04L 63/145 |
| 10,505,985 B1* | 12/2019 | Walter | H04L 63/0263 |
| 2003/0172167 A1* | 9/2003 | Judge | H04L 51/12 709/229 |
| 2013/0332511 A1* | 12/2013 | Hala | H04L 67/34 709/203 |
| 2017/0302665 A1* | 10/2017 | Zou | H04L 63/0876 |

* cited by examiner

SYSTEM AND METHOD FOR MANAGING THE DATA PACKETS EXCHANGED ACROSS A COMPUTER NETWORK

CROSS-REFERENCE TO RELATED APPLICATIONS

The claims disclosed in the present disclosure benefit from the priority associated with the U.S. Provisional Patent Application No. 62/466,046 filed on Mar. 2, 2017 with the title "ENHANCED MANAGEMENT FOR INTER-COMPUTING SYSTEM COMMUNICATION", the contents of which are incorporated herein by the way of reference.

BACKGROUND

Technical Field

The present disclosure relates to computer implemented systems and methods that facilitate management of data packets across a computer network. Particularly, the present disclosure relates to computer-implemented systems and methods that manage the way the data packets are routed between a source computer and a destination computer of the computer network.

Description of the Related Art

Typically, data processing applications process and transmit highly confidential and business critical information. Computer resource security necessitating utmost importance in such scenarios prompt network administrators to look beyond the conventional network security phenomenon such as password locks, firewalls, authorisation controls, authentication techniques and cryptographic techniques.

However, when multitude of computer terminals are interconnected in a distributed computer network, with each of the computer terminals requesting incessant data access from storage devices and data files, employing effective security across the entirety of the distributed computer network becomes a challenge. One of the common techniques employed by network administrators to ensure that the computer network remains secured is to prevent un-trusted computer devices from accessing the computer network, by introducing any of the well-known access control mechanisms into the computer network.

Firewalls, which are one of the most widely used access control mechanisms are configured to block communications, both inbound and outbound based on the configuration, in the event that such communications are determined, by the firewalls to be un-trustful. For instance, a communication incorporating a data packet whose size exceeds the maximum prescribed size may be regarded as malware. Similarly, a communication emanating from an un-authenticated source computer terminal or directed to an un-authenticated destination terminal could be regarded as incorporating malicious content/malware.

Typically, malware and the associated hazardous after-effects caused by the presence of malware are prevalent in communication networks that allow peer computers to communicate with one another using corresponding public IP addresses and pre-defined public ports. Further, communication platforms such as Skype® utilize an overlay peer-to-peer network to transmit video and voice calls, with the objective of routing User Datagram Protocol (UDP) traffic directly between peer computers. Though firewalls are installed across a peer-to-peer communication network with the intention of ensuring maximized data security, and with the intention of identifying and preventing malware from being circulated through the communication network, they (firewalls) tend to inadvertently block legitimate communications (data packets), if such legitimate communications are not an exact match to the operational policies prescribed by the firewalls to differentiate a legitimate communication from malware.

Therefore, while firewalls are regarded as extremely important when it comes to securing a computer network and preventing malwares from accessing and infecting the computer network, and stealing confidential, sensitive data therefrom. However, it is equally important to ensure that the firewall does not block any legitimate, trustful communication that should have been transmitted from a first computer to a second computer via the computer network. It is equally important to configure the firewall such that it (firewall) is enabled to thoroughly differentiate between malware and legitimate communications (data packets), to block only the malware while allowing the legitimate communications to pass there through.

In view of the disadvantages said to be associated with conventional firewalls, there has been felt a need for an improved network architecture that provides for legitimate communications (data packets) to effectively bypass the firewalls while traversing a path from a source computer to a destination computer. There was also felt a need for an improved network architecture that provides for a thorough inspection of the credentials of the data packets before branding them as being legitimate and enabling them to bypass the firewalls while traversing a data path.

Objects

An object of the present disclosure is to envisage a computer-implemented system and method that enhances the security associated with a computer network.

Another object of the present disclosure is to provide a computer-implemented system and method that facilitates seamless inbound and outbound communication between authorized computing devices irrespective of the firewall present across the computer network.

One more object of the present disclosure is to envisage a computer-implemented system and method that provides computer systems competing for network resources, with controlled access thereto, subsequent to validating the credentials of the said computer systems.

Yet another object of the present disclosure is to provide a computer-implemented system and method that facilitates secured transmission of data packets using an intermediary server instead of conventional firewalls.

Still a further object of the present disclosure is to provide a computer-implemented system and method that establishes a communication path between selected computing device using either the corresponding private IP addresses or public IP addresses, with the communication path being free of firewalls.

One more object of the present disclosure is to envisage a computer-implemented system and method that allows for data packets duly verified as being legitimate, to bypass the firewalls situated across the computer network.

Another object of the present disclosure is to envisage a computer-implemented system and method that facilitates seamless transmission of data packets duly verified as being legitimate, from a source computer to a destination computer, without being blocked by any firewalls situated across the computer network.

SUMMARY

In order to overcome the drawbacks discussed hitherto, the present disclosure envisages a system for managing inter-computing system security (a plurality of computing devices interconnected in a computer network). The system envisaged by the present disclosure incorporates a DNS server (hereafter referred to as an intermediary server) that facilitates controlled communication between a plurality of computing devices connected via a computer network. The intermediary server envisaged by the present disclosure receives each communication initiation request emanating from applications executed on a source computer and further validates the communication request before accordingly establishing a communication path with a destination computer, and providing for the communication initiation request to be transmitted from the source computer to the destination computer.

In accordance with the disclosure, a communication initiation request is generated by the source computer for establishing a connection and a consequential communication session with the destination computer. The communication initiation request in this case is redirected to the intermediary server instead of the destination computer, since there exists a possibility that the communication initiation request would be blocked by a destination firewall monitoring the communications inbound to the destination computer.

The 'communication initiation request' is transmitted from the source computer to the intermediary server in the form of a data packet. The data packet is permeably bifurcated into a header portion and a payload portion. The header portion of the data packet includes, in addition to the 'communication initiation request', the relevant public addressing information—the public addressing information including at least the source public IP address and the source public port corresponding to the source computer, and the destination public IP address and the destination public port corresponding to the destination computer. Preferably, the 'communication initiation request' is encapsulated with the 'public addressing information', and the combination of the 'communication initiation request' and 'public addressing information' is embedded into the header portion of the data packet.

Further, the payload portion of the data packet preferably includes the 'data' to be consumed by the destination computer in order to execute an operation requested for by the source computer. Further, it is preferable that the payload portion containing the 'data' intended to be consumed by the destination computer, is encrypted using any of the well-known data encryption techniques.

Further, the intermediary server analyzes the (received) data packet, bifurcates the header portion and the payload portion, and identifies the 'data' intended to be consumed by the destination computer in order to execute the request generated by the source computer, followed by identification of the 'communication initiation request' and the public addressing information—i.e. the source public IP address and the source public port corresponding to the source computer, and the destination public IP address and the destination public port corresponding to the destination computer. Subsequently, the intermediary server compares the source public IP address, the source public port, the destination public IP address and the destination public port, extracted from the 'data packet', with the entries stored in a repository. The entries stored in the said repository correspond to the 'permission information' that describes a plurality of source public IP addresses and source public ports allowed to request for a communication, and a plurality of destination public IP addresses and destination public ports that are allowed to respond to such a request for communication.

In the event that the source public IP address, the source public port, the destination public IP address and the destination public port, extracted from the 'data packet' match with any of the source public IP addresses, source public communication ports, destination public IP addresses and destination public ports stored in the repository, then the source computer is determined to be permitted to communicate with the destination computer, and therefore to transmit the data packet to the destination computer thereby requesting for communication initiation and establishment.

Further, in the event that the source computer is determined to be allowed to communicate with the destination computer, the intermediary server triggers the destination computer, preferably by the way of transmitting a notification thereto. In accordance with the preferred embodiment of the present disclosure, the notification transmitted from the intermediary server to the destination computer also incorporates—in similarity to the data packet transmitted from the source computer to the intermediary server—the 'data' intended to be consumed by the destination computer in order to execute the request generated by the source computer, the 'communication initiation request' and the public addressing information. On being triggered by the intermediary server, by the way of the said notification, the destination computer establishes a connection with the source computer using the said source public IP address, the source public port, the destination public IP address and the destination public port specified by the 'communication initiation request'.

In accordance with the present disclosure, the destination firewall monitoring all the communications inbound to the destination computer would not block the said 'notification' transmitted from the intermediary server to the destination computer, since the said 'notification' is determined to be generated by a trusted source, i.e. the intermediary server, and also since the destination computer which is the intended recipient of the data packet is also known to be a trusted entity (by virtue of the destination computer registering with the intermediary server). Subsequently, the destination computer receives and analyses the 'notification' transmitted from the intermediary server, and in response to the said notification generates a 'response notification', and transmits the 'response notification' to the source computer via the computer network and using the public addressing information, i.e. the source public IP address and the source public port corresponding to the source computer, and the destination public IP address and the destination public port corresponding to the destination computer, initially specified by the said notification (transmitted from the intermediary server to the destination computer). Subsequent to being triggered by the intermediary server, by the way of the said notification, the destination computer establishes a connection and a consequential communication session with the source computer using the said source public IP address, the source public port, the destination public IP address and the destination public port initially specified by the 'notification' (transmitted from the intermediary server to the destination computer).

DETAILED DESCRIPTION

The present disclosure envisages improvements and enhancements corresponding to managing in a secured manner the data communications between a source computer and a destination computer, which in turn form a part of a computer network—typically a public, unsecured peer-to-peer computer network. Any computer system, regardless of being a part of a computer network or functioning as a standalone system, includes various applications that often are required to communicate with other computing systems (such as a web server) to execute designated operation and provide the desired results.

For instance, in an organization's computing network, an application executed on a first computing system (referred to 'source computer' hereafter) is typically required to perform a plurality of look-up operations on a database resident on a second computing system (referred to as 'destination computer' hereafter). In order to consult the database and perform the desired look-up operations, the source computer is required to establish a communication session with the destination computer. Typically, the source computer is communicably coupled to a source firewall that monitors all the outbound communications emanating from the source computer, thereby governing the manner in which the source computer communicates in a typical peer-to-peer computing environment (computer network). Likewise, the destination computer is also communicably coupled to a destination firewall that monitors all the communications inbound to the destination computer, thereby governing the manner in which the destination computer communicates in a typical peer-to-peer computing environment (computer network).

Therefore, when the source computer generates a 'communication initiation request' for requesting setting up a communication session with the destination computer, it is possible that the 'communication initiation request' is blocked by either the source firewall or the destination firewall. In a typical scenario, the source firewall configured to monitor the outbound communications emanating from the source computer, might as well allow the 'communication initiation request' to be transmitted, by regarding the said 'communication initiation request' to be generated from a trustful source, i.e. the source computer. However, even if the said 'communication initiation request' passes through the source firewall, it is likely to be blocked by the destination firewall—which monitors the communications inbound to the destination computer—since the destination firewall does not regard the source computer, and thus the 'communication initiation request' generated by the source computer, as being trustful.

Therefore, to work around both the source firewall and the destination firewall, and to provide for an unhindered communication and data exchange between the source computer and the destination computer, the present disclosure envisages an intermediary server. The intermediary server cooperates with both the source computer and the destination computer and allows for both the source computer and the destination computer to be registered therewith, thereby validating their credentials. Likewise, the registration of the source computer and the destination computer with the intermediary server also enables the source computer and the destination computer and in turn the source firewall and the destination firewall to recognize the intermediary server as a trustful entity (trustful server).

In accordance with the present disclosure, whenever there is a need on the part of the source computer to establish a connection and a communication session with the destination computer, the source computer (i.e. the said application executed on the source computer) generates the 'communication initiation request'. The 'communication initiation request' thus generated is embodied into a header portion of a data packet. The header portion of the data packet further includes, in addition to the 'communication initiation request', the relevant public addressing information—the public addressing information including at least the source public IP address and the source public port corresponding to the source computer, and the destination public IP address and the destination public port corresponding to the destination computer. In a preferred embodiment of the present disclosure, the 'communication initiation request' is encapsulated with the 'public addressing information', and the combination of the 'communication initiation request' and 'public addressing information' is embedded into the header portion of the data packet.

Further, the payload portion of the data packet preferably includes the 'data' to be consumed by the destination computer in order to execute an operation requested for by the source computer. Essentially, the data packet is an amalgamation of the header portion which includes the 'communication initiation request' and the relevant 'public addressing information', and the payload portion which includes the 'data' intended to be consumed by the destination computer. Further, it is preferable that the payload portion containing the 'data' intended to be consumed by the destination computer, is encrypted using any of the well-known data encryption techniques.

The source computer, regardless of the presence of the destination firewall, transmits the data packet to the destination computer. However, sensing the possibility of the data packet being blocked by the destination firewall, the source computer simultaneously transmits the data packet to the intermediary server (preferably as a notification), and notifies the intermediary sever of the need to establish a communication session with the destination computer.

In accordance with the present disclosure, when the data packet is transmitted from the source computer, the source firewall monitoring all the outbound communications emanating from the source computer permits the (outbound) transmission of the 'data packet' since the said 'data packet' is identified to be generated by a trusted source, i.e. the source computer, and also since the intermediary server which is the intended recipient of the data packet is known to be a trusted entity (by virtue of the source computer registering with the intermediary server).

Further, the data packet is received by the intermediary server, which in turn analyzes the data packet, bifurcates the header portion and the payload portion, and identifies the 'data' intended to be consumed by the destination computer in order to execute the request generated by the source computer, followed by identification of the 'communication initiation request' and the public addressing information— i.e. the source public IP address and the source public port corresponding to the source computer, and the destination public IP address and the destination public port corresponding to the destination computer.

Subsequently, the intermediary server compares the source public IP address, the source public port, the destination public IP address and the destination public port, extracted from the 'data packet', with the entries stored in a repository. The entries stored in the said repository correspond to the 'permission information' that describes a plurality of source public IP addresses and source public ports allowed to request for a communication, and a plurality of destination public IP addresses and destination public ports that are allowed to respond to such a request for communication.

In the event that the source public IP address, the source public port, the destination public IP address and the destination public port, extracted from the 'data packet' match with any of the source public IP addresses, source public communication ports, destination public IP addresses and destination public ports stored in the repository, then the source computer is determined to be permitted to communicate with the destination computer, and therefore to transmit the data packet to the destination computer thereby requesting for communication initiation and establishment.

Further, in the event that the source computer is determined to be allowed to communicate with the destination computer, the intermediary server triggers the destination computer, preferably by the way of transmitting a notification thereto. In accordance with the preferred embodiment of the present disclosure, the notification transmitted from the intermediary server to the destination computer also incorporates—in similarity to the data packet transmitted from the source computer to the intermediary server—the 'data' intended to be consumed by the destination computer in order to execute the request generated by the source computer, the 'communication initiation request' and the public addressing information.

In accordance with the present disclosure, the destination firewall monitoring all the communications inbound to the destination computer would not block the said 'notification' transmitted from the intermediary server to the destination computer, since the said 'notification' is determined to be generated by a trusted source, i.e. the intermediary server, and also since the destination computer which is the intended recipient of the data packet is also known to be a trusted entity (by virtue of the destination computer registering with the intermediary server).

Subsequently, the destination computer receives and analyses the 'notification' transmitted from the intermediary server, and in response to the said notification generates a 'response notification', and transmits the 'response notification' to the source computer via the computer network and using the public addressing information, i.e. the source public IP address and the source public port corresponding to the source computer, and the destination public IP address and the destination public port corresponding to the destination computer, initially specified by the said notification (transmitted from the intermediary server to the destination computer). Subsequent to being triggered by the intermediary server, by the way of the said notification, the destination computer establishes a connection and a consequential communication session with the source computer via the computer network and using the said source public IP address, the source public port, the destination public IP address and the destination public port initially specified by the 'notification' (transmitted from the intermediary server to the destination computer).

In view of the possibility that the source firewall and/or the destination firewall would block the 'data packet' generated by the source computer requesting for a communication with the destination computer, the source computer is configured to transmit the said data packet to an intermediary sever, bypassing the source firewall by the virtue of the data packet being generated by a trusted source, i.e. the source computer, and also by the virtue of the source computer being registered with said intermediary server. Further, the intermediary server is configured to analyze the data packet transmitted from the source computer and to acknowledge the need to establish a communication between the source computer and the destination computer.

The intermediary server subsequently generates a notification notifying the destination computer to establish a communication (preferably by the way of a communication session) with the source computer. The notification generated by the intermediary server, and directed to the destination computer includes the 'data' intended to be consumed by the destination computer in order to execute the request generated by the source computer, and the 'communication initiation request' and the public addressing information (the public addressing information comprising the source public IP address, the source public port, the destination public IP address and the destination public port). Further, while transmitting the said notification to the destination computer, the intermediary server bypasses the destination firewall by the virtue of being a trusted entity and also by the virtue of the fact that the destination computer is registered with the intermediary server thereby providing for both the intermediary server and the destination computer to be mutually regarded as being trustful.

Further, in response to receiving the said notification from the intermediary sever, the destination computer generates the 'response notification' and transmits the said 'response notification' to the source computer using the source public IP address, the source public port, the destination public IP address and the destination public port, specified by the notification, thereby establishing a communication with the source computer and subsequently initiating a communication session with the source computer. In this case, the 'response notification' transmitted (outbound) from the destination computer to the source computer is not blocked firstly by the destination firewall since it (the destination firewall) is restricted to monitoring only the communications inbound to the destination computer, and secondly by the source firewall since it (the source firewall) is restricted to monitoring only the communications outbound from the source computer. In this way, the 'response notification' transmitted from the destination computer to the source computer manages to bypass the destination firewall as well as the source firewall and establishes a communication session between the source computer and the destination computer despite the presence of the source firewall and the destination firewall.

Figure 1A:
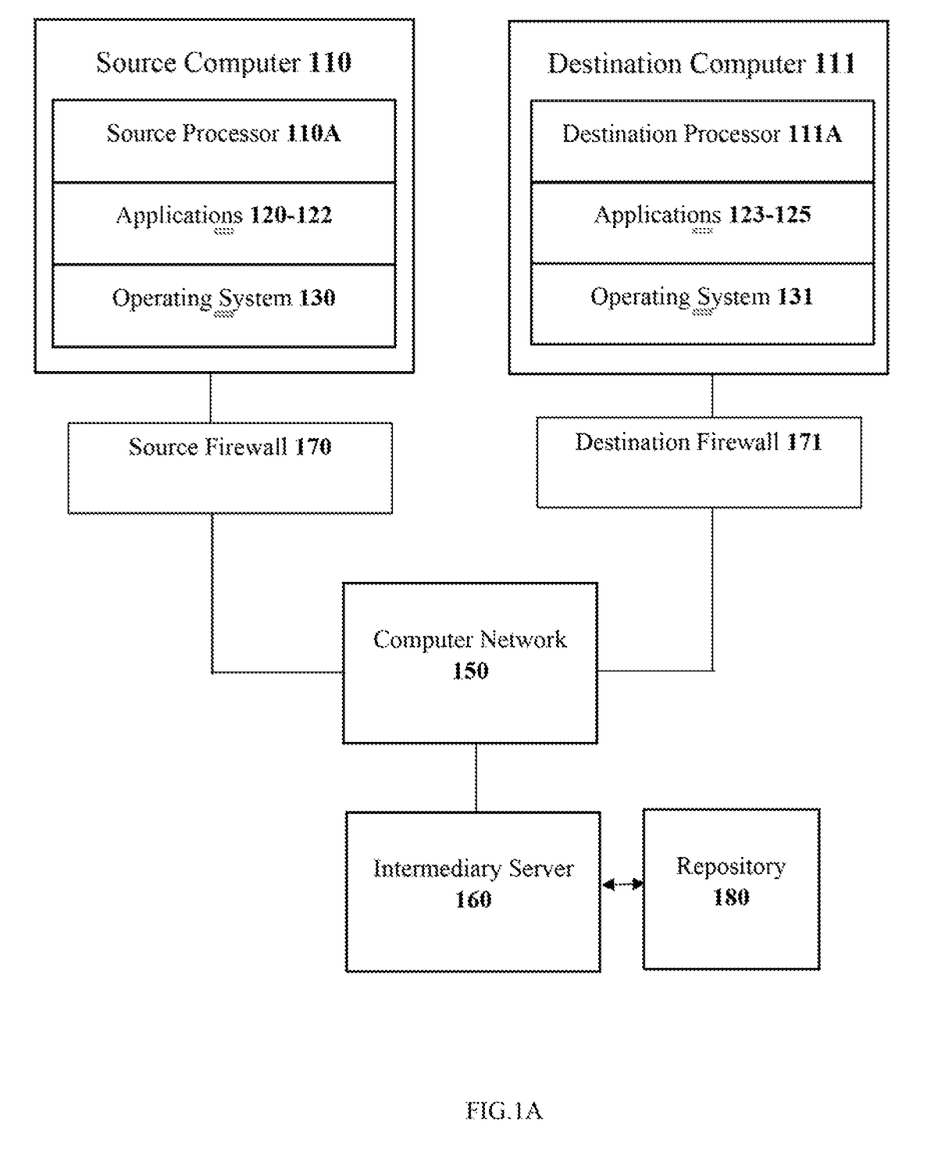
FIG. 1A is a block diagram illustrating the network components communicably coupled to a computer network, in accordance with the present disclosure.

In accordance with the present disclosure, FIG. 1A is a block diagram of the system incorporating the source computer 110 and the destination computer 111. The source computer 110 and the destination computer 111 are communicably coupled to one another and the intermediary server 160 through the computer network 150. The source computer 110 typically incorporates a source processor 110A, an operating system 130, and executes a plurality of applications 120-122. Further, the source computer 110 includes is communicably coupled to the source firewall 170 that that monitors all the outbound communications emanating from the source computer 110, thereby governing the manner in which the source computer 110 communicates with the other network entities via the computer network 150.

Similarly, the destination computer 111 incorporates a destination processor 111A, an operating system 131, and executes a plurality of applications 123-125. Further, the destination computer 111 is communicably coupled to a destination firewall 171 that monitors all the communications inbound to the destination computer 111, thereby governing the manner in which all the network entities, and especially the source computer 110 communicates with the destination computer 111 using the computer network 150.

In accordance with the present disclosure, the applications 120-122 and 123-125 executed by the source computer 110 and destination computer 111 respectively include but are not restricted to database applications, web service applications, email applications, gaming applications, and front-end applications. Typically, during execution of any of the above-mentioned applications, the source computer 110 and in turn the source processor 110A might necessitate a communication (initiation and establishment of a communication session) with the destination computer 111. For example, a web browsing application executed by the source processor 110A might necessitate a look up on a database hosted on the destination computer 111. Therefore, in such cases, a 'communication initiation request' embodying a destination public IP address (identifying the location of the database) and the data to be consumed by the database while performing the desired lookup operation, is generated by the source computer 110. Preferably, the 'communication initiation request' also identifies the destination public port to be used for transmitting the 'communication initiation request' to the destination computer 111. Further, the 'communication initiation request' also identifies the source public IP address identifying the source computer 110 generating the 'communication initiation request' and the source public port from which the 'communication initiation request' is transmitted.

Subsequently, the 'communication initiation request' is embodied into a data packet (not shown in figures) comprising a header portion and the data portion. Preferably, the header portion (of the data packet) incorporates the 'communication initiation request' and the public addressing information including the source public IP address, the source public port (corresponding to the source computer), and the destination public IP address, the destination public port (corresponding to the destination computer). Preferably, the payload portion of the data packet incorporates the 'data' to be consumed by the destination computer 111 for performing the desired lookup operation, Preferably, the payload portion of the data packet incorporating the 'data' is encrypted prior to the transmission of the data packet, using well known data encryption techniques.

Typically, when the source computer 110 generates a 'communication initiation request' for requesting setting up a communication session with the destination computer 111, it is possible that the 'communication initiation request'—which is in turn embodied into (the) data packet—is blocked by either the source firewall 170 or the destination firewall 171. In a typical scenario, the source firewall 170 configured to monitor the outbound communications emanating from the source computer 110, might as well allow the 'data packet' to be transmitted, by regarding the said 'data packet' to be generated from a trustful source, i.e. the source computer 110. However, even if the said 'data packet' passes through the source firewall 170, it is likely to be blocked by the destination firewall 171—which monitors the communications inbound to the destination computer 111—since the destination firewall 171 does not regard the source computer 110, and thus the 'data packet' generated by the source computer 110, as being trustful.

In accordance with the present disclosure, whenever there is a need on the part of the source computer 110 to establish a connection and a communication session with the destination computer 111, the source computer 110 (preferably any of the applications 120-122 executed by the source processor 110A) generates the 'communication initiation request'. The 'communication initiation request' thus generated is embodied into a header portion of a data packet. The header portion of the data packet further includes, in addition to the 'communication initiation request', the relevant public addressing information—the public addressing information including at least the source public IP address and the source public port corresponding to the source computer 110, and the destination public IP address and the destination public port corresponding to the destination computer 111.

Further, the payload portion of the data packet preferably includes the 'data' to be consumed by the destination computer 111 in order to execute an operation requested for by the source computer 110. Essentially, the data packet is an amalgamation of the header portion which includes the 'communication initiation request' and the relevant 'public addressing information', and the payload portion which includes the 'data' intended to be consumed by the destination computer. Further, it is preferable that the payload portion containing the 'data' intended to be consumed by the destination computer, is encrypted using any of the well-known data encryption techniques.

In accordance with the present disclosure, the source computer 110, regardless of the presence of the source firewall 170 and the destination firewall 171, transmits the data packet to the destination computer 111. However, sensing the possibility of the data packet being blocked by the destination firewall 171, the source computer 110 simultaneously transmits the data packet (preferably in the form of a notification), to the intermediary server 160 thereby notifying the intermediary sever 160 of the need to establish a communication session with the destination computer 111.

In accordance with the present disclosure, when the data packet is transmitted from the source computer 110, the source firewall 170 monitoring all the outbound communications emanating from the source computer 110 permits the (outbound) transmission of the 'data packet' since the said 'data packet' is identified to be generated by a trusted source, i.e. the source computer 110, and also since the intermediary server 160 which is the intended recipient of the data packet is known to be a trusted entity (by virtue of the source computer 110 registering with the intermediary server 160).

Further, the data packet is received by the intermediary server 160, which in turn analyzes the data packet, bifurcates the header portion and the payload portion, and identifies the 'data' intended to be consumed by the destination computer 111 in order to execute the request generated by the source computer 110, followed by the identification of the 'communication initiation request' and the public addressing information—i.e. the source public IP address and the source public port corresponding to the source computer 110, and the destination public IP address and the destination public port corresponding to the destination computer 111.

Subsequently, the intermediary server 160 compares the source public IP address, the source public port, the destination public IP address and the destination public port, extracted from the 'data packet', with the entries stored in a repository 180. The entries stored in the repository 180 correspond to the 'permission information' that describes a plurality of source public IP addresses and source public ports allowed to request for a communication, and a plurality of destination public IP addresses and destination public ports that are allowed to respond to such a request for communication.

In the event that the source public IP address, the source public port, the destination public IP address and the destination public port, extracted from the 'data packet' match with any of the source public IP addresses, source public communication ports, destination public IP addresses and destination public ports stored in the repository 180, then the source computer 110 is determined to be permitted to communicate with the destination computer 111, and therefore to transmit the data packet to the destination computer 111 thereby requesting for communication initiation and establishment.

Further, in the event that the source computer 110 is determined to be allowed to communicate with the destination computer 111, the intermediary server 160 triggers the destination computer 111, preferably by the way of transmitting a notification thereto. In accordance with the preferred embodiment of the present disclosure, the notification transmitted from the intermediary server 160 to the destination computer 111 also incorporates—in similarity to the data packet transmitted from the source computer 110 to the intermediary server 160—the 'data' intended to be consumed by the destination computer 111 in order to execute the request generated by the source computer 110, the 'communication initiation request' and the public addressing information. On being triggered by the intermediary server 160, by the way of the said notification, the destination computer 111 establishes a connection with the source computer 110 using the said source public IP address, the source public port, the destination public IP address and the destination public port initially specified by the 'communication initiation request' and communicated to the destination computer 111 by the intermediary server 160 in the form of the said notification.

In accordance with the present disclosure, the destination firewall 171 monitoring all the communications inbound to the destination computer 111 would not block the said 'notification' transmitted from the intermediary server 160 to the destination computer 111, since the said 'notification' is determined to be generated by a trusted source, i.e. the intermediary server 160, and also since the destination computer 111 which is the intended recipient of the data packet is also known to be a trusted entity (by virtue of the destination computer 111 registering with the intermediary server 160). Subsequently, the destination computer 111 receives and analyses the 'notification' transmitted from the intermediary server 160, and in response to the said notification generates a 'response notification', and transmits the 'response notification' to the source computer 110 via the computer network 150 and using the public addressing information, i.e. the source public IP address and the source public port corresponding to the source computer 110, and the destination public IP address and the destination public port corresponding to the destination computer 111, initially specified by the said notification (transmitted from the intermediary server 160 to the destination computer 111). Subsequent to being triggered by the intermediary server 160, by the way of the said notification, the destination computer 111 establishes a connection and a consequential communication session with the source computer 110 via the computer network 150 and using the said source public IP address, the source public port, the destination public IP address and the destination public port initially specified by the 'notification' (transmitted from the intermediary 160 server to the destination computer 111).

In view of the possibility that the source firewall 170 and/or the destination firewall 171 would block the 'data packet' generated by the source computer 110 requesting for a communication with the destination computer 111, the source computer 110 is configured to transmit the said data packet to an intermediary sever 160 instead of the destination computer 111, bypassing the source firewall 170 by the virtue of the data packet being generated by a trusted source, i.e. the source computer 110, and also by the virtue of the source computer 110 being registered with said intermediary server 160. Further, the intermediary server 160 is configured to analyze the data packet transmitted from the source computer 110 and to acknowledge the need to establish a communication (via the computer network 150) between the source computer 110 and the destination computer 111.

The intermediary server 160 subsequently generates a notification notifying the destination computer 111 to establish a communication (preferably by the way of a communication session) with the source computer 110. The notification generated by the intermediary server 160, and directed to the destination computer 111 includes the 'data' intended to be consumed by the destination computer 111 in order to execute the request generated by the source computer, and the 'communication initiation request' and the public addressing information (the public addressing information comprising the source public IP address, the source public port, the destination public IP address and the destination public port). Further, while transmitting the said notification to the destination computer 111, the intermediary server 160 bypasses the destination firewall 171 by the virtue of being a trusted entity and also by the virtue of the fact that the destination computer 111 is registered with the intermediary server 160 thereby providing for both the intermediary server 160 and the destination computer 111 to be mutually regarded as being trustful.

Further, in response to receiving the said notification from the intermediary sever 160, the destination computer 111 generates the 'response notification' and transmits the said 'response notification' to the source computer 110 using the source public IP address, the source public port, the destination public IP address and the destination public port, specified by the notification initially transmitted by the intermediary server 160 to the destination computer 111, thereby establishing a communication with the source computer 110 and subsequently initiating a communication session with the source computer 110. In this case, the 'response notification' transmitted (outbound) from the destination computer 111 to the source computer 110 is not blocked firstly by the destination firewall 171 since it (the destination firewall 171) is restricted to monitoring only the communications inbound to the destination computer 111, and secondly by the source firewall 170 since it (the source firewall 170) is restricted to monitoring only the communications outbound from the source computer 110. In this way, the 'response notification' transmitted from the destination computer 111 to the source computer 110 manages to bypass the destination firewall 171 as well as the source firewall 170 and establishes a communication session between the source computer 110 and the destination computer 111 despite the presence of the source firewall 170 and the destination firewall 171.

Figure 1B:
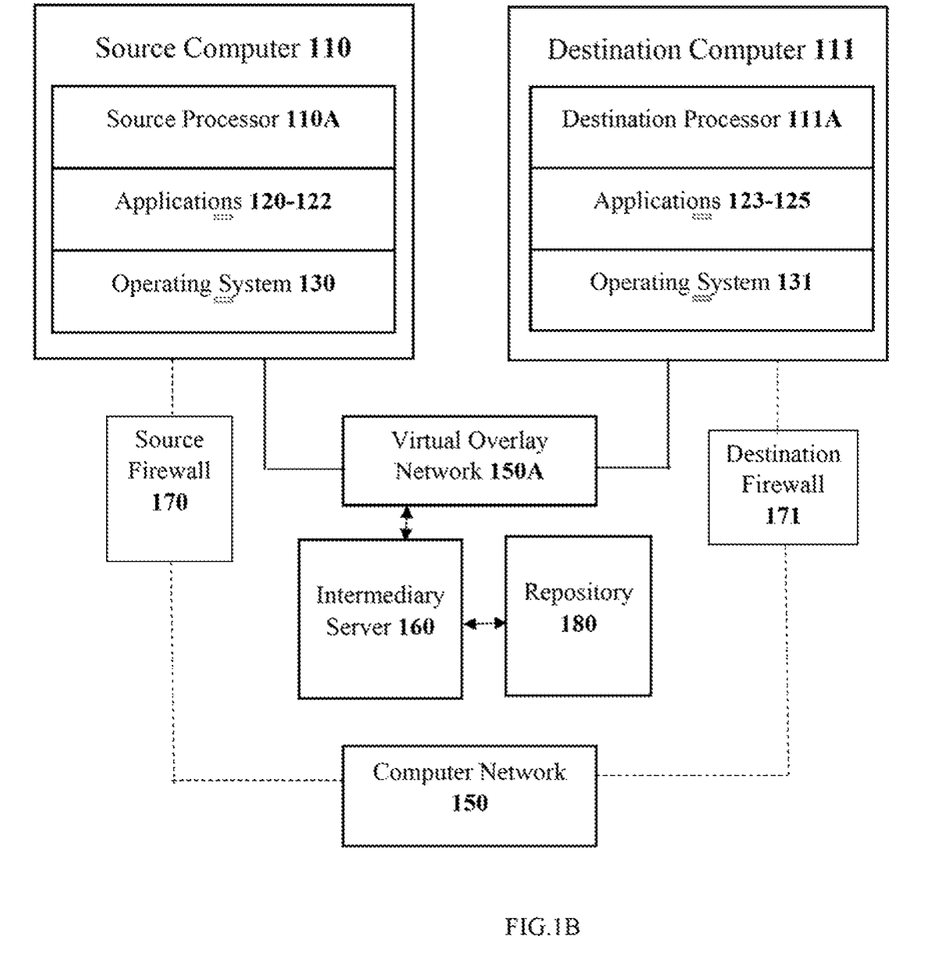
FIG. 1B is a block diagram illustrating the network components communicably coupled to a virtual overlay network, in accordance with a second embodiment of the present disclosure.

FIG. B illustrates a second embodiment of the present disclosure according to which the 'data packet' embodying the 'communication initiation request' and the data to be consumed by the destination computer 111 for executing the operation desired by the source computer 110 and the 'public addressing information', also embodies 'private addressing information'. In accordance with the second embodiment of the present disclosure, while the 'public addressing information' includes the source public IP address and source public port (corresponding to source computer 110), and destination public IP address and destination public port (corresponding to the destination computer 111), the 'private addressing information' includes source private IP address and source private port (corresponding to source computer 110), and destination private IP address and destination private port (corresponding to the destination computer 111).

In accordance with the second embodiment of the present disclosure, the intermediary server 160 analyzes the data packet and identifies the 'data' intended to be consumed by the destination computer 111 in order to execute the request generated by the source computer 110, followed by the identification of the 'communication initiation request' and the 'public addressing information' (the source public IP address and the source public port corresponding to the source computer 110, and the destination public IP address and the destination public port corresponding to the destination computer 111) and the 'private addressing information' (the source private IP address and the source private port corresponding to the source computer 110, and the destination private IP address and the destination private port corresponding to the destination computer 111).

Subsequently, in accordance with the second embodiment of the present disclosure, the intermediary server 160 extracts and processes the 'private addressing information' instead of the 'public addressing information' and compares the source private IP address, the source private port, the destination private IP address and the destination private port, with the entries stored in the repository 180.

In accordance with the second embodiment of the present disclosure, the entries stored in the repository 180 correspond to the 'permission information' that describes a plurality of source private IP addresses and source private ports allowed to request for a communication, and a plurality of destination private IP addresses and destination private ports that are allowed to respond to such a request for communication.

In the event that the source private IP address, the source private port, the destination private IP address and the destination private port, extracted from the 'data packet' match with any of the source private IP addresses, source private communication ports, destination private IP addresses and destination private ports stored in the repository 180, then the source computer 110 is determined to be permitted to communicate with the destination computer 111, and therefore to transmit the data packet to the destination computer 111 thereby requesting for communication initiation and establishment.

Further, in the event that the source computer 110 is determined to be allowed to communicate with the destination computer 111, the intermediary server 160 triggers the destination computer 111, preferably by the way of transmitting a notification thereto. In accordance with the second embodiment of the present disclosure, the notification transmitted from the intermediary server 160 to the destination computer 111 incorporates the 'data' intended to be consumed by the destination computer 111 in order to execute the request generated by the source computer 110, the 'communication initiation request', the public addressing information and the 'private addressing information'. On being triggered by the intermediary server 160, by the way of the said notification, the destination computer 111 establishes a connection with the source computer 110 using the said source private IP address, the source private port, the destination private IP address and the destination private port initially specified by the 'communication initiation request' transmitted to the destination computer 111 by the intermediary server 160 in the form of the said notification.

In accordance with the second embodiment of the present disclosure, when the source computer 110 is determined to be allowed to communicate with the destination computer 111, the intermediary server 160 triggers the destination computer 111 to establish a secured, private connection (in the form of a virtual overlay network denoted by reference numeral 150A) with the source computer 110, using the said source private IP address, the source private port, the destination private IP address and the destination private port specified by the 'communication initiation request' initially transmitted from the intermediary server 160 to the destination computer 111 in the form of the said notification.

In accordance with the second embodiment of the present disclosure, the intermediary server 160 establishes the virtual overlay network 150 between the source computer 110 and the destination computer 111 (in addition to a typical, unsecured, public computer network (denoted by reference numeral 150 in FIG. 1A) already connecting the source computer 110 and the destination computer 111), and designates the source computer 110 and destination computer 111 to be identified on the virtual overlay network 150 only by the corresponding source private IP address and destination private IP address.

In accordance with the second embodiment of the present disclosure, by establishing the virtual overlay network 150 between the source computer 110 and the destination computer 111, the intermediary server 160 bypasses the source firewall 170 and the destination firewall 171 which are a part of the conventional computer network 150 (represented in FIG. 1A). Further, the intermediary server 160 renders the virtual overlay network 150 accessible only to the source computer 110 and the destination computer 111 to communicate with one another and to exchange data packets using the source private IP address and destination private address and the corresponding private ports, while ensuring that the virtual overlay network 150 remains inaccessible to any other computer on the unsecured, public network 150.

In accordance with the second embodiment of the present disclosure, when the virtual overlay network 150 is established between the source computer 110 and the destination computer 111, the convention computer 150 incorporating the source firewall 170 and the destination firewall 171 is rendered dormant. The dormant computer network 150, and the dormant source firewall 170 and dormant destination firewall 171 are represented in FIG. 1B using dotted connecting lines.

Figure 2:
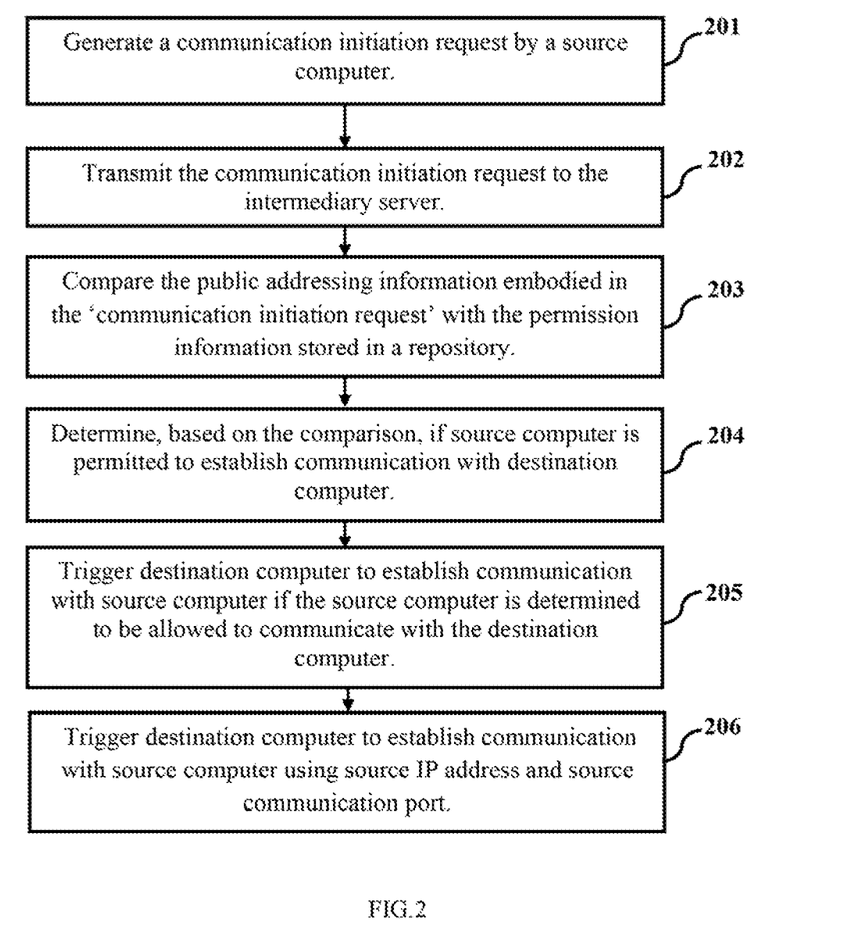
FIG. 2 illustrates a flowchart describing the steps involved in the method for managing the data packets exchanged across a computer network, in accordance with the present disclosure. It is to be noted that throughout the specification, and throughout the aforementioned drawings, like features have been denoted using like numerals.

Referring to FIG. 2, there is shown a flowchart illustrating the steps involved in the method for managing security of data packets exchanged across a computer network. As described in FIG. 2, a communication initiation request is generated by the source computer for establishing a connection and a consequential communication session with the destination computer (step 201). The communication initiation request in this case is redirected to the intermediary server (step 202) instead of the destination computer, since the source computer is configured to acknowledge the possibility that the communication initiation request would be blocked by a destination firewall monitoring the communications inbound to the destination computer.

The 'communication initiation request' is transmitted from the source computer to the intermediary server in the form of a data packet. The data packet is permeably bifurcated into a header portion and a payload portion. The header portion of the data packet includes, in addition to the 'communication initiation request', the relevant public addressing information—the public addressing information including at least the source public IP address and the source public port corresponding to the source computer, and the destination public IP address and the destination public port corresponding to the destination computer. Preferably, the 'communication initiation request' is encapsulated with the 'public addressing information', and the combination of the 'communication initiation request' and 'public addressing information' is embedded into the header portion of the data packet.

Further, the payload portion of the data packet preferably includes the 'data' to be consumed by the destination computer in order to execute an operation requested for by the source computer. Further, it is preferable that the payload portion containing the 'data' intended to be consumed by the destination computer, is encrypted using any of the well-known data encryption techniques.

Further, the intermediary server analyzes the (received) data packet, bifurcates the header portion and the payload portion, and identifies the 'data' intended to be consumed by the destination computer in order to execute the request generated by the source computer, followed by identification of the 'communication initiation request' and the public addressing information—i.e. the source public IP address and the source public port corresponding to the source computer, and the destination public IP address and the destination public port corresponding to the destination computer. Subsequently, the intermediary server compares the source public IP address, the source public port, the destination public IP address and the destination public port, extracted from the 'data packet', with the entries stored in a repository (step 203). The entries stored in the said repository correspond to the 'permission information' that describes a plurality of source public IP addresses and source public ports allowed to request for a communication, and a plurality of destination public IP addresses and destination public ports that are allowed to respond to such a request for communication.

In the event that the source public IP address, the source public port, the destination public IP address and the destination public port, extracted from the 'data packet' match with any of the source public IP addresses, source public communication ports, destination public IP addresses and destination public ports stored in the repository, then the source computer is determined to be permitted to communicate with the destination computer, and therefore to transmit the data packet to the destination computer thereby requesting for communication initiation and establishment (step 204).

Further, in the event that the source computer is determined to be allowed to communicate with the destination computer, the intermediary server triggers the destination computer, preferably by the way of transmitting a notification thereto (step 205). In accordance with the preferred embodiment of the present disclosure, the notification transmitted from the intermediary server to the destination computer also incorporates—in similarity to the data packet transmitted from the source computer to the intermediary server—the 'data' intended to be consumed by the destination computer in order to execute the request generated by the source computer, the 'communication initiation request' and the public addressing information. On being triggered by the intermediary server, by the way of the said notification, the destination computer establishes a connection with the source computer via the computer network and using the said source public IP address, the source public port, the destination public IP address and the destination public port initially specified by the 'communication initiation request' (step 206).

In accordance with the present disclosure, the destination firewall monitoring all the communications inbound to the destination computer would not block the said 'notification' transmitted from the intermediary server to the destination computer, since the said 'notification' is determined to be generated by a trusted source, i.e. the intermediary server, and also since the destination computer which is the intended recipient of the data packet is also known to be a trusted entity (by virtue of the destination computer registering with the intermediary server). Subsequently, the destination computer receives and analyses the 'notification' transmitted from the intermediary server, and in response to the said notification generates a 'response notification', and transmits the 'response notification' to the source computer via the computer network and using the public addressing information, i.e. the source public IP address and the source public port corresponding to the source computer, and the destination public IP address and the destination public port corresponding to the destination computer, initially specified by the said notification (transmitted from the intermediary server to the destination computer).

TECHNICAL ADVANTAGES

The technical advantages envisaged by the present disclosure include the realization of an improved network architecture that provides for legitimate communications (data packets) to effectively bypass the firewalls while traversing a path from a source computer to a destination computer. The improved network architecture envisaged by the present disclosure also provides for a thorough inspection of the credentials of the data packets before branding them as being legitimate and enabling them to bypass the firewalls while traversing a data path.

What is claimed is:

1. A computer-implemented system for managing communications within a computer network, said system comprising:
   a memory;
   a source processor residing on a source computer, said source computer communicably coupled to a source firewall monitoring outbound communications from said source computer;
   a destination processor residing on a destination computer, said destination computer communicably coupled to a destination firewall monitoring inbound communications to said destination computer;
   an intermediary server cooperating with said source computer and said destination computer, said source computer and said destination computer registered to said intermediary server on basis of corresponding authentication information authenticating said source computer and said destination computer respectively; and
   wherein said source processor is configured to:
   generate a communication initiation request for establishing a communication session between said source computer and said destination computer, said communication initiation request specifying at least a source IP address identifying said source computer, a destination IP address identifying said destination computer, a source communication port corresponding to said source computer and a destination communication port corresponding to said destination computer;

establish a first communication path with said intermediary server thereby bypassing said source firewall monitoring only outbound communications from said source computer, by virtue of said source computer being registered with said intermediary server;

transmit said communication initiation request to said intermediary server via said first communication path; and wherein said intermediary server comprises:

a repository storing at least permission information corresponding to the computer network, said permission information indicative of at least destination IP addresses, destination communication ports and source IP addresses, source communication ports configured to facilitate said communications within said computer network; and wherein said intermediary server is configured to:

process said communication initiation request, and determine, based on a comparison between said permission information stored in said repository and said destination IP address and destination communication port specified by said communication initiation request, whether said source computer is authorized to establish said communication session with said destination computer;

establish a second communication path with said destination server and subsequently bypass said destination firewall monitoring only inbound communications to said destination computer, by virtue of said destination computer being registered with said intermediary server;

generate a notification in response to said communication initiation request received from said source computer, and transmit said notification to said destination computer via said second communication path;

trigger said destination computer, by way of said notification, to establish said communication session with said source computer, only in an event that said source computer is determined to be allowed to initiate said communication session with said destination computer; and trigger said destination computer to communicate with said source computer, and transmit at least one outbound response to said communication initiation request, using said source IP address, said source communication port, said destination IP address, and said destination communication port specified by said communication initiation request, and wherein said outbound response while in transit to said source computer bypasses said destination firewall monitoring only inbound communications to said destination computer.

2. The system as claimed in claim 1, wherein said intermediary server is further configured to determine, based on said communication initiation request, a private destination IP address and a private destination communication port corresponding to said destination computer, said intermediary server further configured to determine, based on said communication initiation request, a private source IP address and a private source communication port corresponding to said source computer.

3. The system as claimed in claim 2, wherein said intermediary server is further configured to trigger said destination computer to communicate with said source computer using said private source IP address, said private source communication port, said private destination IP address, and said private destination communication port.

4. The system as claimed in claim 1, wherein said intermediary server is further configured to compare said source IP address and said destination IP address specified by said communication initiation request, with said permission information indicative of said source IP addresses and said destination IP addresses, to determine whether there exists a match between said source IP address and said destination IP address specified by said communication initiation request and said permission information.

5. The system as claimed in claim 1, wherein said intermediary server is further configured to compare said source port and said destination port specified by said communication initiation request, with said permission information indicative of plurality of source communication ports and plurality of destination communication ports, to determine whether there exists a match between said source port and said destination port specified by said communication initiation request, and said permission information.

6. A computer-implemented method for managing communications within a computer network, said method comprising following computer implemented steps:

generating, by a source computer, a communication initiation request for establishing a communication session between said source computer and a destination computer, said communication initiation request specifying at least a source IP address identifying said source computer, a destination IP address identifying said destination computer, a source communication port corresponding to said source computer and a destination communication port corresponding to said destination computer;

establishing, by said source computer, a first communication path with an intermediary server, thereby bypassing a source firewall monitoring only outbound communications from said source computer by virtue of said source computer being registered with said intermediary server;

registering said source computer and said destination computer to said intermediary server, on basis of corresponding authentication information authenticating said source computer and said destination computer respectively;

transmitting, by said source computer, said communication initiation request to said intermediary server via said first communication path;

storing in a repository, at least permission information corresponding to the computer network, said permission information indicative of at least destination IP addresses, destination communication ports and source IP addresses, source communication ports configured to facilitate said communications within said computer network;

processing, by said intermediary server, said communication initiation request, and determining based on a comparison between said permission information stored in said repository and said destination IP address and destination communication port specified by said communication initiation request, whether said source computer is authorized to establish said communication session with said destination computer;

establishing, by said intermediary server, a second communication path with said destination server, thereby bypassing said destination firewall monitoring only inbound communications to said destination computer by virtue of said destination computer being registered with said intermediary server;

generating, by said intermediary server, a notification in response to said communication initiation request, and transmitting said notification to said destination computer via said second communication path;

transmitting, by said intermediary server, said notification to said destination server, and triggering said destination computer to establish said communication session with said source computer, only in an event that said source computer is determined to be allowed to initiate said communication session with said destination computer; and triggering, by said intermediary server, said destination computer to communicate with said source computer, and causing said destination computer to transmit at least one outbound response to said communication initiation request, using said source IP address, said source communication port, said destination IP address, and said destination communication port, and wherein said outbound response, while in transit to said source computer bypasses said destination firewall monitoring only inbound communications to said destination computer.

7. The method as claimed in claim 6, wherein the method further includes the following steps:

determining, by said intermediary server, based on said communication initiation request, a private destination IP address and a private destination communication port corresponding to said destination computer; and determining, by said intermediary server, based on said communication initiation request, a private source IP address and a private source communication port corresponding to said source computer.

8. The method as claimed in claim 7, wherein the method further includes the step of selectively triggering, by said intermediary server, said destination computer to communicate with said source computer using said private source IP address, said private source communication port, said private destination IP address, and said private destination communication port.

9. The method as claimed in claim 6, wherein the step of determining whether said source computer is authorized to establish said communication session with said destination computer, further includes the following steps:

comparing said source IP address and said destination IP address specified by said communication initiation request, with said permission information indicative of said source IP addresses and said destination IP addresses; and determining whether there exists a match between said source IP address and said destination IP address specified by said communication initiation request and said permission information.

10. The method as claimed in claim 6, wherein the step of determining whether said source computer is authorized to establish said communication session with said destination computer, farther includes the following steps:

comparing said source port and said destination port specified by said communication initiation request, with said permission information indicative of plurality of source communication ports and plurality of destination communication ports; and determining whether there exists a match between said source port and said destination port specified by said communication initiation request, and said permission information.

11. A non-transitory computer readable storage medium having computer-readable instructions stored thereupon, the instructions when executed by the processor cause the processor to:

generate a communication initiation request for establishing a communication session between a source computer and a destination computer, said communication initiation request specifying at least a source IP address identifying said source computer, a destination IP address identifying said destination computer, a source communication port corresponding to said source computer and a destination communication port corresponding to said destination computer;

establish a first communication path with an intermediary server, thereby bypassing a source firewall monitoring only outbound communications from said source computer by virtue of said source computer being registered with said intermediary server;

register said source computer and said destination computer to said intermediary server, on basis of corresponding authentication information authenticating said source computer and said destination computer respectively;

transmit said communication initiation request to said intermediary server via said first communication path;

store in a repository, at least permission information corresponding to the computer network, said permission information indicative of at least destination IP addresses, destination communication ports and source IP addresses, source communication ports configured to facilitate said communications within said computer network;

process said communication initiation request, and determine based on a comparison between said permission information stored in said repository and said destination IP address and destination communication port specified by said communication initiation request, whether said source computer is authorized to establish said communication session with said destination computer;

establish a second communication path with said destination server, thereby bypassing said destination firewall monitoring only inbound communications to said destination computer by virtue of said destination computer being registered with said intermediary server;

generate a notification in response to said communication initiation request, and transmit said notification to said destination computer via said second communication path;

transmit said notification to said destination server, and trigger said destination computer to establish said communication session with said source computer, only in an event that said source computer is determined to be allowed to initiate said communication session with said destination computer; and trigger said destination computer to communicate with said source computer, and causing said destination computer to transmit at least one outbound response to said communication initiation request, using said source IP address, said source communication port, said destination IP address, and said destination communication port, and wherein said outbound response, while in transit to said source computer bypasses said destination firewall monitoring only inbound communications to said destination computer.

12. The computer-readable instructions as claimed in claim 11, wherein the computer-readable instructions when executed by the processor, further cause the processor to:

determine based on said communication initiation request, a private destination IP address and a private destination communication port corresponding to said destination computer;

determine based on said communication imitation request, a private source IP address and a private source communication port corresponding to said source computer;

trigger said destination computer to communicate with said source computer using said private source IP address, said private source communication port, said private destination IP address, and said private destination communication port;

compare said source IP address and said destination IP address specified by said communication initiation request, with said permission information indicative of said source IP addresses and said destination IP addresses;

determine whether there exists a match between said source IP address and said destination IIP address specified by said communication initiation request and said permission information;

compare said source port and said destination port specified by said communication initiation request, with said permission information indicative of plurality of source communication ports and said plurality of destination communication ports; and determine whether there exists a match between said source port and said destination port specified by said communication initiation request, and said permission information.

\* \* \* \* \*